METHOD FOR THE PRODUCTION OF CONCENTRATED NITROGEN OXIDE

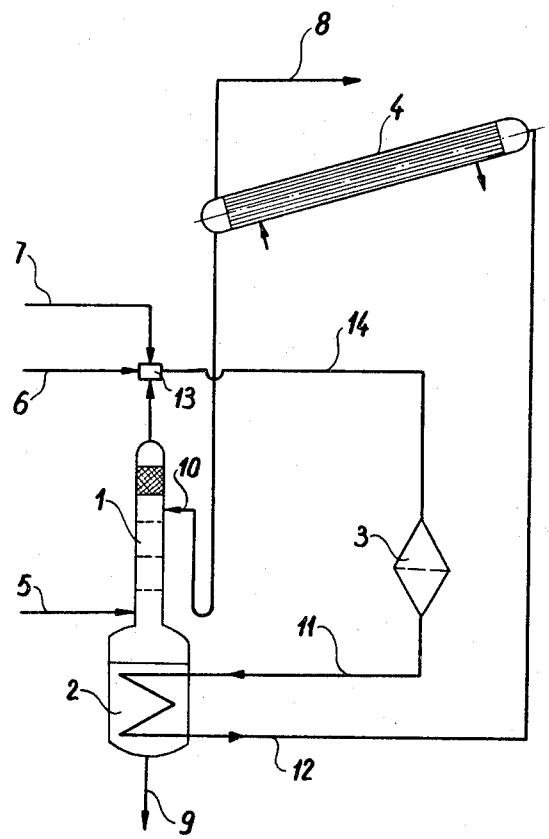

Witold Janiczek, Henryk Ryszawy, and Antoni Gajewski, Tarnow, Poland, assignors to Instytut Nawozow Sztucznych, Pulawy, Poland
Filed Apr. 12, 1968, Ser. No. 720,997
Claims priority, application Poland, Apr. 15, 1967, P 120,022
Int. Cl. C01c *1/18;* C01b *21/26*
U.S. Cl. 23—103          5 Claims

ABSTRACT OF THE DISCLOSURE

In a process wherein $NH_3$ is oxidized with oxygen and water vapor to form nitric oxide and water vapor, the water vapor upon being condensed, carries with it, a small amount of nitric oxide which forms diute $HNO_3$. The dilute $HNO_3$, otherwise useless, is neutralized with $NH_3$ to form dilute $NH_4NO_3$ which is then concentrated using the heat evolved during its formation.

---

An object of the present invention is an improvement in the method for the production of concentrated nitrogen oxide containing at least 92% vy volume of NO formed in the catalytic oxidation of ammonia with oxygen diluted with steam, wherein the dilute nitric acid formed in the process as a by-product is utilized.

One of the most advantageous of the known methods of production of concentrated nitrogen oxide is the method comprising directly oxidizing ammonia with purified oxygen on a platinum catalyst.

Since nitrogen-oxygen mixtures of the optimum ratio have explosive properties, the mixture is suitably diluted with steam to obtbain a non-explosive mixture of ammonia, oxygen and water vapor. A reaction mixture consisting of about 13 to 18% of $NH_3$, about 19 to 26% of $O_2$ and about 55 to 68% of water vapor proved to be the most suitable.

A mixture of the above composition is fed into a reactor wherein the reaction

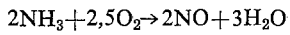

takes place, which yields nitrogen oxide, at a temperature of about 850° C.

In addition to the above reaction: a side reaction,

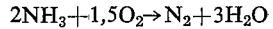

takes place which yields nitrogen.

The hot reacted gases, at a temperature of about 850° C. and containing nitrogen oxide, water vapor and small quantities of other gases e.g. nitrogen, are led into a utilizer vessel, wherein the reacted gases are cooled to a temperature of 200° C., and further to a water cooler, wherein the reacted gases are further cooled to a temperature close to the ambient temperature.

Almost all the water vapor from the reacted gases is condensed in said cooler and certain quantity of nitrogen oxides dissolves in the condensate, thus forming a dilute nitric acid containing about 7 to 12% of $HNO_3$.

The dilute nitric acid is discharged and the remaining gas containing more than 90% of NO is directed to a further treatment. A disadvantage of the above method is the formation of a great quantity of dilute nitric acid which, as such, is of limited applicability since the process of concentration of the acid is both expensive and troublesome.

An object of this invention is the provision of a method which utilizes the troublesome dilute nitric acid which is formed in the process as a by-product. Since there is no industrial demand for great quantities of dilute acid containing 7 to 12% $HNO_3$, and neutralization of the acid prior to discharging it as a waste being expensive, said great quantity of dilute by-product acid is ballast in the process of production of concentrated NO.

According to the present invention, the dilute nitric acid formed in the course of condensation of water vapor is neutralized with gaseous ammonia and the dilute ammonium nitrate solution thus formed is concentrated in a suitable evaporator. The concentration is effected using the heat of neutralization of the acid with ammonia, as well as the heat carried by the hot reacted gases. Steam generated in the course of concentration of the dilute ammonium nitrate solution is directed to the ammonia-oxygen mixture where the steam, in addition to acting as a heat carrier, also prevents the formation of an explosive mixture and reduces the temperature of the reaction of ammonia oxidation on platinum catalyst to about 800° to 900° C. An advantage of the method according to the invention is the complete elimination of troublesome wastes and the partial utilization of the waste heat of the process. In addition, an ammonium nitrate solution of concentration of about 40% is obtained, which can be utilized e.g. for the production of nitrogenous fertilizers. Neutralization of the dilute nitric acid is carried out in an installation shown schematically in the accompanying drawing.

Ammonia in a quantity sufficient for neutralization of the dilute acid and for preparation of the reaction mixture is introduced via conduit 5 into column 1 arranged direcctly above evaporator 2 serving the purpose of neutralization of dilute nitric acid with gaseous ammonia. Dilute nitric acid condensed in the water cooler is introduced into column head 10.

Dilute ammonium nitrate solution formed in column 1 is concecntrated in evaporator 2 which is heated with reacted gases directed thereto through conduit 11, and the water vapour formed in the evaporator 2 is led through column 1, together with the ammonia, to mixer 13.

Thus concentrated ammonium nitrate containing about 40% $NH_4NO_3$ is led out by conduit 2.

Oxygen in a quantity necessary to prepare the reaction mixture and the complementary quantity of steam are supplied to mixer 13 by conduits 6 and 7, respectively. Thus prepared reaction mixture is led by conduit 14 into the reactor 3 wherein the reaction.

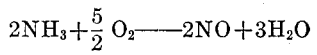

proceeds at a temperature of about 850° C. on a platinum catalyst, yielding nitrogen oxide.

Hot reacted gases are led by conduit 11 into evaporator 2 wherein they are cooled to about 200° C. and further by conduit 12 to the cooler 4.

In the cooler 4 the gases are cooled to about 30° C. and almost all the water vapor content of the gases is condensed and a quantity of nitrogen oxides dissolves in the condensate, which results in the formation of dilute nitric acid containing about 7 to 12% $HNO_3$. The dilute nitric acid is led from cooler 4 by conduit 10 to neutralization column 1 while the remaining gases containing about 90% NO are led by conduit 8 outside.

EXAMPLE

A reaction mixture consisting of about 96 Nm.³ of $NH_3$, about 130 Nm.³ of $O_2$ and about 452 kg. of steam is fed from mixer 13 by conduit 14 to reactor 3.

The reaction is carried out at a temperature of about 850° C. Hot reacted gases of temperature of about 850° C., containing about 87 Nm.³ of NO, about 7 Nm.³ of inert gases and water vapor, are led by conduit 11 into evaporator 2 where from, after being cooled to about 200° C., the gases are led by conduit 12 to cooler 4. From cooler 4 the concentrated nitrogen oxide, containing about 62 Nm.³ of NO, about 2.5 kg. of water vapor and about 7 Nm.³ of inert gases, is led out.

Besides, from cooler 4 dilute nitric acid, containing about 11.8% of $HNO_3$, is led by conduit 10 to neutralization column 1.

The column 1 is supplied with about 122 Nm.³ of gaseous ammonia, by conduit 5, a portion of the supply ammonia, in the quantity of about 26 Nm.³, being consumed to neutralize the nitric acid, while the remaining quantity of the ammonia, together with the steam generated in the course of evaporation of the ammonium nitrate formed, is led into gas mixer 13. In evaporator 2 about 306 kg. of water are evaporated and all the steam formed therein is led into mixer 13. Additional steam in the quantity of about 145 kg. is replenished via steam piping 7. Ammonium nitrate solution containing about 40% of $NH_4NO_3$ in the quantity of about 233 kg. is led from evaporator by conduit 9 out of the system.

What we claim is:

1. In a method for producing concentrated nitric oxide which comprises oxidizing gaseous ammonia with oxygen diluted with water vapor at a temperature of about 850° C. on a platinum catalyst to form a mixture of hot gases including nitric oxide and water vapor, whererin said water vapor is condensed together with a small amount of the nitric oxide dissolved therein resulting in the formation of dilute nitric acid, an improvement which comprises neutralizing said dilute nitric acid with ammonia to form a dilute ammonium nitrate solution with the evovlution of heat, concentrating said dilute ammonium nitrate solution to form a concentrated ammonium nitrate solution and steam, said steam comprising a portion of the water vapor with which the oxygen is diluted; the concentrating of said dilute ammonium nitrate solution being effected with the heat evolved during the formation of the ammonium nitrate and the heat contained in the hot gases in the mixture.

2. An improvement as claimed in claim 1, wherein the dilute nitric accid contains 7–12% $HNO_3$.

3. An improvement as claimed in claim 1, wherein oxidizing is effected at about 800–900° C.

4. An improvement as claimed in claim 1, wherein the dilute ammonium nitrate solution is concentrated to about 40%.

5. An improvement as claimed in claim 1, wherein said hot gases are cooled to about 200° C. during the concentration of the dilute ammonium nitrate and then to about 30° C. during the condensation of the water vapor contained therein.

References Cited

UNITED STATES PATENTS

| | | | |
|---|---|---|---|
| 1,811,712 | 6/1931 | Boyd | 23—103 |
| 2,650,660 | 9/1953 | Martin et al. | 23—103X |
| 3,110,563 | 11/1963 | Kraus et al. | 23—162 |
| 3,285,695 | 11/1966 | Cook et al. | 23—103 |

OSCAR R. VERTIZ, Primary Examiner

G. O. PETERS, Assistant Examiner

U.S. Cl. X.R.

23—162